(No Model.)

O. T. SWITZER.
HARROW.

No. 561,452. Patented June 2, 1896.

Witnesses

Inventor
Otis T. Switzer
By J. C. Fitzgerald
Atty.

UNITED STATES PATENT OFFICE.

OTIS T. SWITZER, OF MONTOUR, IOWA.

HARROW.

SPECIFICATION forming part of Letters Patent No. 561,452, dated June 2, 1896.

Application filed August 26, 1895. Serial No. 560,580. (No model.)

*To all whom it may concern:*

Be it known that I, OTIS T. SWITZER, a citizen of the United States, residing at Montour, in the county of Tama, State of Iowa, have invented a certain new and useful Improvement in Harrows; and I do hereby declare the following to be a full, clear, and exact description of the invention, such as will enable others skilled in the art to which it appertains to make and use the same.

My invention relates to an improvement in harrows or drags.

The invention will first be described in connection with the accompanying drawings, and then particularly pointed out in the claim.

Figure 1:
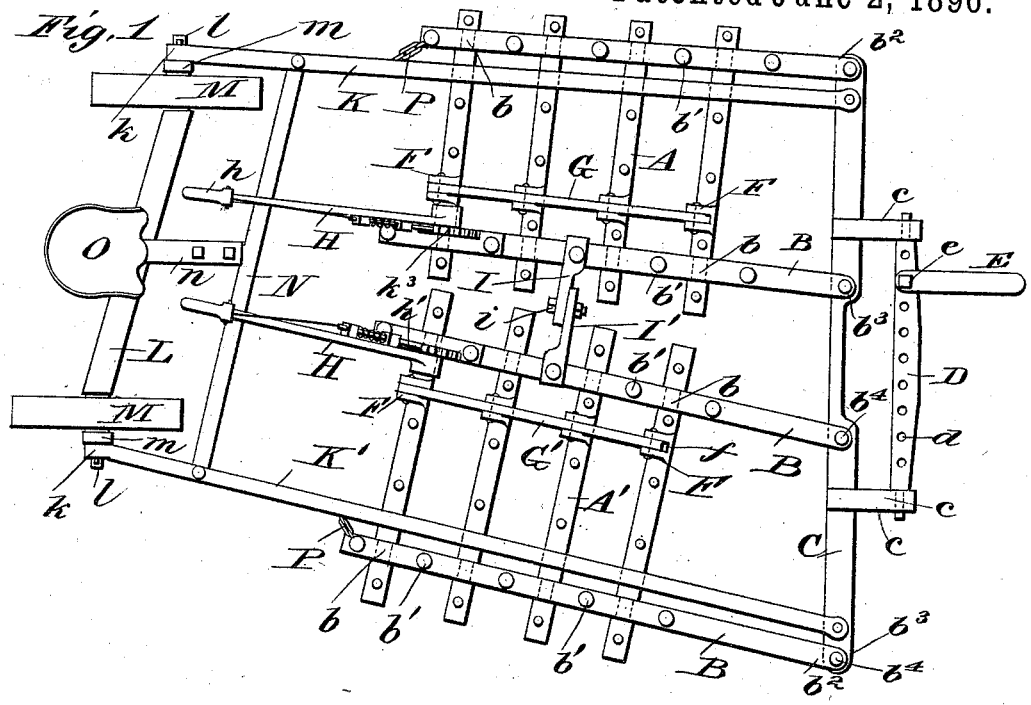
Figure 2:
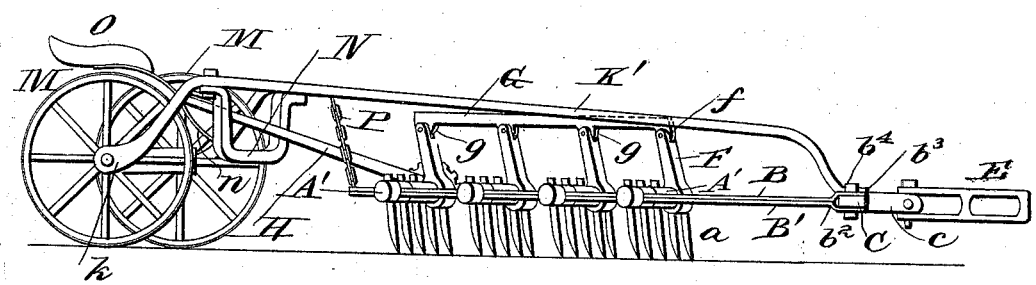
Figure 3:
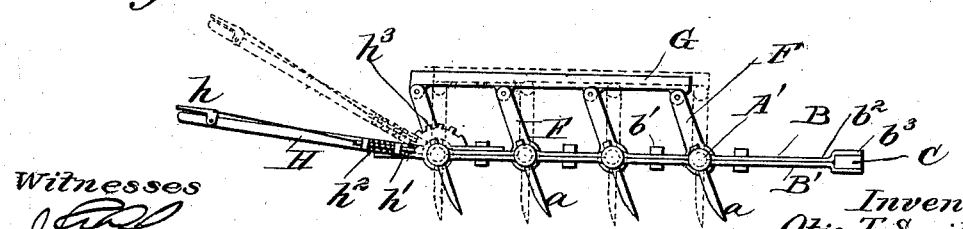

In the drawings, Figure 1 is a plan view of a device embodying my invention. Fig. 2 is a side elevation of the same. Fig. 3 is a detail view of one of the harrow-sections.

Referring to the drawings, A A' are a series of harrow-bars provided with harrow-teeth $a$ and revolubly mounted in bearings $b$, formed by bearing-straps B B', which comprise upper bearing-straps B and lower bearing-straps B', which are bent into semicircular shape to form the said bearings $b$, the harrow-bars being reduced in diameter where they rest in the bearings to prevent longitudinal shifting of the said bars. The upper and lower bars are held together in pairs by bolts $b'$, one pair of bars being arranged near each end of each set of harrow-bars A A'. It will be plain that by tightening or loosening the bolts $b'$ the amount of friction of the harrow-bars in the bearings $b'$ may be increased or diminished within certain limits, as may be desired. The front end $b^2$ of each pair of bearing-straps projects beyond the harrow-bars, the length of the projecting ends increasing from one side toward the other, as shown in Fig. 1, all the said ends $b^2$ being formed into clevises $b^3$, which are attached to a cross-bar C, normally secured on an angle to the harrow-bars whereby the harrow when in operation is drawn at an angle to the line of draft and thus more thoroughly pulverizing the ground, by bolts $b^4$.

The cross-bar C is provided with a pair of forwardly-projecting brackets $c$, in which is pivotally mounted a draft-bar D, provided with a series of pin-holes $d$, into any one of which may be inserted a pin $e$, which secures a clevis device E to the draft-bar D, this clevis device serving for the attachment of the team which draws the harrow.

Each harrow-bar A has an upwardly-projecting arm F fixed to said harrow-bar and slotted, as shown at $f$, into which slot enters an ear $g$ on an adjusting-bar G G', extending transversely of the bars, there being two of these adjusting-bars, one for each section of the harrow.

The last or rear harrow-bar of each section is provided with a lever H, fixed to it in any suitable manner and adapted to rotate the said rear harrow-bars, whereby all the harrow-bars of the section are rotated through the medium of the arms F and adjusting-bars G G', thus changing the angle of the slope of the harrow-teeth.

To hold each lever H in any desired position, it is provided with the usual pawl-lever $h$ and pawl $h'$, held by a spring $h^2$ into engagement with a ratchet-segment $h^3$, fixed to the rear end of the inner pair of bearing-bars of each section.

To prevent the two sections of the harrow from spreading apart, each section is provided with a bracket I I', secured to its respective inner pair of bearing-bars, said brackets being arranged to lap one beyond the other, their overlapping ends being held together pivotally by a bolt $i$, passing through both brackets.

To the cross-bar C near each end are attached the reach-bars K K', arched near the ends, as shown, to enable the said bars to clear the harrow-sections, the rear ends of said reach-bars K K' being provided with bearings $k$, in which are mounted the outer ends $l$ of an axle L, the said ends $l$ being each at an angle to the middle portion of the axle and having their axes in parallel vertical planes. On each end $l$ is revolubly mounted a wheel M, collars $m$ being inserted between the wheels and the bearings $k$ of the reach-bars.

The rear ends of the reach-bars K K' are held together by a transverse brace or bar N, secured to the under side of said reach-bars and connected to the axle by a seat-bar $n$, to which the seat O is bolted, as shown.

To the rear ends of the outer pairs of bearing-bars are attached chains P, connected also to the reach-bars, whereby the undue lateral movement of the harrow-sections is prevented.

It will be seen that in my construction the harrow-bars are drawn along at an angle to the line of draft, while the wheels, being on axles at right angles to said line of draft, will properly follow the same.

Having thus fully described my invention, what I claim as new, and desire to secure by Letters Patent, is—

The combination, with a plurality of harrow-bars, and a series of bearing-bars of unequal length, in which the harrow-bars are mounted, a cross-bar connecting the front ends of the bearing-bars, a draft device connected to the cross-bar, a pair of reach-bars connected to the outer ends of the cross-bar, an axle having reduced ends at an angle to it, each end projecting through one of the reach-bars, a wheel mounted on each axle end, within said reach-bars, a transverse bar secured to the under side of the reach-bars, a support carried by the said transverse bar and axle, and a seat mounted on said support, substantially as described.

In testimony whereof I affix my signature in presence of two witnesses.

OTIS T. SWITZER.

Witnesses:
S. O. SIMKINS,
A. B. ARNOLD.